United States Patent
Lee et al.

(10) Patent No.: US 12,229,704 B2
(45) Date of Patent: Feb. 18, 2025

(54) APPARATUS, SYSTEM, AND METHOD FOR COMPANY-CUSTOMIZED WORK EVALUATION BASED ON WORK SINCERITY AND WORK CONCENTRATION

(71) Applicant: KOREA ELECTRONICS TECHNOLOGY INSTITUTE, Seongnam-si (KR)

(72) Inventors: Min Goo Lee, Seoul (KR); Yong Kuk Park, Seoul (KR); Tae Heon No, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/649,056

(22) Filed: Apr. 29, 2024

(65) Prior Publication Data
US 2024/0378539 A1 Nov. 14, 2024

(30) Foreign Application Priority Data
May 10, 2023 (KR) .......................... 10-2023-0060502

(51) Int. Cl.
*G06Q 10/06* (2023.01)
*G06Q 10/0639* (2023.01)

(52) U.S. Cl.
CPC ............................... *G06Q 10/0639* (2013.01)

(58) Field of Classification Search
CPC ...................................................... G06Q 10/06
See application file for complete search history.

(56) References Cited

U.S. PATENT DOCUMENTS

2012/0035987 A1* 2/2012 Anand ............. G06Q 10/06398
705/7.42
2014/0114699 A1* 4/2014 Amigo .................. A61B 5/1115
705/4
(Continued)

FOREIGN PATENT DOCUMENTS

KR   10-2012-0007302 A    1/2012
KR      10-2214006 B1    2/2021
(Continued)

OTHER PUBLICATIONS

Al-Jumaili et al., Technology Solutions MPMM 2011 Maintenance Performance Measurement & Management, Proceedings of MPMM, 1st Maintenance Performance Measurement and Management, International Conference on Dec. 13-15, 2011. (Year: 2011).*

(Continued)

*Primary Examiner* — Kurtis Gills
(74) *Attorney, Agent, or Firm* — Knobbe, Martens, Olson & Bear, LLP

(57) ABSTRACT

Proposed is an apparatus, system, and method for conducting a company-customized work evaluation of employees based on work sincerity and work concentration to induce employees toward the ideal talent pursued by the company. The apparatus may receive an input of setting values for work sincerity and work concentration each including a plurality of evaluation items, setting values for weights for the respective evaluation items, and setting values for satisfaction/violation conditions from a manager terminal. Additionally, the apparatus may receive data on work sincerity and work concentration obtained by collecting and counting event information on satisfaction/violation for each evaluation item according to an employee's work from a plurality of employee terminals. Also, the apparatus may perform work evaluation on a plurality of employees via a (Continued)

work evaluation algorithm that uses the work sincerity and work concentration data and the weights as input values.

8 Claims, 17 Drawing Sheets

(56) References Cited

U.S. PATENT DOCUMENTS

| | | | |
|---|---|---|---|
| 2017/0116552 A1* | 4/2017 | Deodhar | G06Q 10/0639 |
| 2018/0039526 A1* | 2/2018 | Mulla | G06Q 10/06312 |
| 2018/0039927 A1* | 2/2018 | Harpale | G06Q 10/06398 |
| 2018/0046967 A1* | 2/2018 | Ghosh | G06Q 10/06393 |
| 2022/0067208 A1* | 3/2022 | Miller | G06Q 30/018 |
| 2022/0405692 A1* | 12/2022 | Trikannad | G06Q 10/063114 |

FOREIGN PATENT DOCUMENTS

| | | |
|---|---|---|
| KR | 10-2286028 B1 | 8/2021 |
| KR | 10-2022-0003861 A | 1/2022 |
| WO | WO-2022047332 A1 * 3/2022 | ........... G06F 21/604 |

OTHER PUBLICATIONS

Office Action dated Jul. 30, 2023 in Korean Application No. 10-2023-0060502, in 14 pages.
Notice of Allowance dated Oct. 23, 2023 in Korean Application No. 10-2023-0060502, in 6 pages.

* cited by examiner

| September work evaluation | Time | Number | Magnitude | TNM Value |
|---|---|---|---|---|
| Employee 1 | 26 | 8 | 60 | 94 |
| Employee 2 | 30 | 1 | 2 | 33 |
| Employee 3 | 14 | 4 | 70 | 88 |

| October work evaluation | Time | Number | Magnitude | TNM Value |
|---|---|---|---|---|
| Employee 1 | 11 | 2 | 4 | 17 |
| Employee 2 | 0 | 0 | 0 | 0 |
| Employee 3 | 3 | 1 | 15 | 19 |

FIG. 14

| October work evaluation | Time | Number | Magnitude | TNM Value |
|---|---|---|---|---|
| Employee 1 | 11 | 2 | 4 | 17 |
| Employee 2 | 0 | 0 | 0 | 0 |
| Employee 3 | 3 | 1 | 15 | 19 |

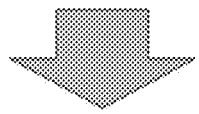 Result of normalization

| | Time | Number | Magnitude | TNM Value |
|---|---|---|---|---|
| Employee 1 | 3 (very poor) | 3 (very poor) | 1 (excellent) | 7 |
| Employee 2 | 1 (excellent) | 1 (excellent) | 1 (excellent) | 3 |
| Employee 3 | 1 (excellent) | 2 (poor) | 3 (very poor) | 6 |

FIG. 16

| | Min value | Max value | Interval |
|---|---|---|---|
| Time | 0 | 30 | 10 |
| Number | 0 | 8 | 2.7 |
| Magnitude | 0 | 70 | 23 |

| | 1 point (excellent) range | 2 points (poor) range | 3 points (very poor) range |
|---|---|---|---|
| Time | 0 ~ 10 | 11 ~ 20 | 21 ~ 30 |
| Number | 0 ~ 2.7 | 2.8 ~ 5.5 | 5.6 ~ 8 |
| Magnitude | 0 ~ 23 | 24 ~ 47 | 48 ~ 70 |

FIG. 17

| September work evaluation | Time | Number | Magnitude | TNM Value |
|---|---|---|---|---|
| Employee 1 | 3 (very poor) | 3 (very poor) | 3 (very poor) | 9 |
| Employee 2 | 3 (very poor) | 1 (excellent) | 1 (excellent) | 5 |
| Employee 3 | 2 (poor) | 2 (poor) | 3 (very poor) | 7 |
| October work evaluation | Time | Number | Magnitude | TNM Value |
| Employee 1 | 2 (poor) | 1 (excellent) | 1 (excellent) | 4 |
| Employee 2 | 1 (excellent) | 1 (excellent) | 1 (excellent) | 3 |
| Employee 3 | 1 (excellent) | 1 (excellent) | 1 (excellent) | 3 |

FIG. 19

| | September | October | Improvement score (IS) |
|---|---|---|---|
| Employee 1 | (3, 3, 3) | (2, 1, 1) | 3 points |
| Employee 2 | (3, 1, 1) | (1, 1, 1) | 2 points |
| Employee 3 | (2, 2, 3) | (1, 1, 1) | 2.5 points |

APPARATUS, SYSTEM, AND METHOD FOR COMPANY-CUSTOMIZED WORK EVALUATION BASED ON WORK SINCERITY AND WORK CONCENTRATION

CROSS REFERENCE TO RELATED APPLICATION

The present application claims priority to Korean Patent Application No. 10-2023-0060502 filed May 10, 2023, the entire contents of which are incorporated herein for all purposes by this reference.

BACKGROUND

Technical Field

The present disclosure relates to work evaluation technology for companies. Specifically, the present disclosure relates to an apparatus, system, and method for conducting a company-customized work evaluation of employees based on work sincerity and work concentration to induce employees toward the ideal talent pursued by the company.

Description of Related Technology

Around the world, society is gradually becoming more exposed to and accustomed to non-face-to-face environments. In response to crises such as the spread of global infectious diseases like COVID-19, this change to non-face-to-face living is further accelerating.

In response to such changes in living environments, non-face-to-face work is also becoming a necessity rather than an option in the work environment of companies. As interest in non-face-to-face work collaboration is increasing socially and industrially, it is becoming more important for companies to secure systems and infrastructure that can flexibly apply non-face-to-face work methods to the company organization during this crisis.

SUMMARY

One aspect is an apparatus, system, and method for company-customized work evaluation based on work sincerity and work concentration, not to focus on relative evaluation for surveilling or disciplining individual employees, but to guide employees toward the company's customized ideal talent by considering the characteristics of each company.

Another aspect is a work evaluation apparatus, system, and method customized for each company based on work sincerity and work concentration so as to induce employees toward the company's customized ideal talent by offering information about the employee's current evaluation position, improvement direction, and improvement rate through a fair work evaluation on employees.

Another aspect is a work evaluation apparatus, system, and method customized for each company based on work sincerity and work concentration so as to offer work evaluation results to allow employees to easily understand the work evaluation results.

Another aspect is an apparatus for company-customized work evaluation based on work sincerity and work concentration that includes a communication unit communicating with a manager terminal and a plurality of employee terminals, and a controller configured to receive an input of setting values for work sincerity and work concentration each including a plurality of evaluation items, setting values for weights for the respective evaluation items, and setting values for satisfaction/violation conditions from the manager terminal through the communication unit, to receive data on work sincerity and work concentration obtained by collecting and counting event information on satisfaction/violation for each evaluation item according to an employee's work from the employee terminals, to perform work evaluation on a plurality of employees via a work evaluation algorithm that uses the work sincerity and work concentration data and the weights as input values, and to perform an integrated work evaluation by applying an integrated weight to the work evaluation based on the work sincerity and the work concentration.

The work evaluation algorithm performs the work evaluation on the plurality of employees, based on a TNM value (TNM_WES) calculated by applying a plurality of evaluation influence factors including a violation time (T), a violation number (N), and a violation magnitude (M) for each evaluation item, and weights assigned to the plurality of evaluation influence factors.

The violation time (T) is an evaluation influence factor for when an employee most recently committed a violation, the violation number (N) is an evaluation influence factor for how often an employee commits a violation, and the violation magnitude (M) is an evaluation influence factor for the degree (magnitude) of the employee's violation.

The controller calculates the TNM value for each particular period, and in order to unify a value of the violation time (T) with other values, the controller preprocesses a most recent violation date, used as the violation time (T), based on a last day of the particular period to count days by using a start date of the particular period as $1^{st}$.

The controller normalizes preprocessed TNM values for each evaluation influence factor to calculate normalized TNM values, defines a plurality of levels for each evaluation influence factor, sets normal values differentially for the plurality of levels, identifies minimum and maximum values for the values calculated for each evaluation influence factor, divides a difference value between the identified minimum and maximum values into a plurality of values corresponding to the plurality of levels, and normalizes the preprocessed TNM values to the normal value of the plurality of corresponding levels to calculate the normalized TNM values.

The controller converts the normalized TNM value into a coordinate position of (T, N, M), and visualizes the normalized TNM values as a three-axis graph using the violation time (T), the violation number (N), and the violation magnitude (M) as axes in which coordinates of (0, 0, 0) in the three-axis graph represent an excellent talent pursued by a company, such that an employee or a manager intuitively recognizes the work evaluation results by comparing his/her or other employee's coordinates with the coordinates of excellent talent on the 3-axis graph.

The controller divides a particular period into a plurality of unit periods, calculates normalized TNM values for each unit period, and provides information about a degree of improvement in work evaluation through changes in the normalized TNM values for each unit period.

The evaluation items included in the work sincerity may include compliance with commuting time, a number of times of tardiness, a number of times of early leaving, a number of times of absenteeism without notice, a number of times schedules (deadlines) are not met, and a number of complaints triggered.

The evaluation items included in the work concentration may include number and time of use of work-unrelated apps, number and time of use of work-related apps, and number of negative evaluations and reports by managers/colleagues.

Among the evaluation items included in the work sincerity, for the compliance with commuting time, the number of times of tardiness, the number of times of early leaving, the number of times of absenteeism without notice, and the number of times schedules (deadlines) are not met, event information may be collected and counted based on first/last use time of the employee terminal, first/last use time of the work management program, a network access time within the company, and vehicle departure recognition information.

Among the evaluation items included in the work concentration, for the number and time of use of work-unrelated apps, the number and time of use of work-related apps, and the number of negative evaluations and reports by managers/colleagues, event information may be collected and counted based on first/last use time of the employee terminal, first/last use time of the work management program, first/last use time of a work-unrelated program, a network access time within the company, and a receipt of negative evaluations/reports.

The number of complaints triggered, and the number of negative evaluations and reports by managers/colleagues may be collected from the manager terminal or a complaint reception device.

The TNM value may be calculated using Equation below:

$$TNM\_WES \text{ (Work Evaluation Score)} = (w1*(w11*aT + w12*bT + \ldots w15eT)) + (w2*(w21*aN + w22*bN + \ldots w25eN)) + (w3*(w31*aM + w33*bM + \ldots w35eM)) \quad \text{EQUATION}$$

T: Time of violation
N: Number of violations
M: Magnitude of violation
aT: Violation time of commute
aN: Violation number of commute
aM: Violation magnitude of commute
bT: Violation time of early leaving
bN: Violation number of early leaving
bM: Violation magnitude of early leaving
cT: Violation time of absenteeism
cN: Violation number of absenteeism
cM: Violation magnitude of absenteeism
dT: Violation time of schedule or deadline
dN: Violation number of schedule or deadline
dM: Violation magnitude of schedule or deadline
eT: Violation time of complaint (occurrence)
eN: Violation number of complaint (occurrence)
eM: Violation magnitude of complaint (occurrence)
w1~w3: Weights for evaluation influence factors (violation time, violation number, and violation magnitude)
w11~w35: Weights for evaluation items.

The controller may convert the normalized TNM value into a coordinate position of (T, N, M) and calculate a distance (d) between the coordinate positions in two unit periods as an improvement score.

Another aspect is a system for company-customized work evaluation based on work sincerity and work concentration that includes a manager terminal configured to deliver an input of setting values for work sincerity and work concentration each including a plurality of evaluation items, setting values for weights for the respective evaluation items, and setting values for satisfaction/violation conditions to a work evaluation apparatus; a plurality of employee terminals each configured to deliver data on work sincerity and work concentration obtained by collecting and counting event information on satisfaction/violation for each evaluation item according to an employee's work to the work evaluation apparatus; and the work evaluation apparatus configured to perform work evaluation on a plurality of employees via a work evaluation algorithm that uses the work sincerity and work concentration data and the weights as input values, and to perform an integrated work evaluation by applying an integrated weight to the work evaluation based on the work sincerity and the work concentration.

Another aspect is a method for company-customized work evaluation based on work sincerity and work concentration that includes, by a work evaluation apparatus, receiving an input of setting values for work sincerity and work concentration each including a plurality of evaluation items, setting values for weights for the respective evaluation items, and setting values for satisfaction/violation conditions from a manager terminal; by the work evaluation apparatus, receiving data on work sincerity and work concentration obtained by collecting and counting event information on satisfaction/violation for each evaluation item according to an employee's work from a plurality of employee terminals; by the work evaluation apparatus, performing work evaluation on a plurality of employees via a work evaluation algorithm that uses the work sincerity and work concentration data and the weights as input values; and by the work evaluation apparatus, performing an integrated work evaluation by applying an integrated weight to the work evaluation based on the work sincerity and the work concentration.

According to the present disclosure, it is possible to set the evaluation items and weights for work sincerity and work concentration based on the unique characteristics (industry, size, type, etc.) of the company and thereby establish the most optimal customized talent for the company. Also, it is possible to provide the employees with information about the employee's current evaluation position, improvement direction, and improvement rate based on the work evaluation results, and also induce employees toward the ideal talent pursued by the company.

In addition, according to the present disclosure, in a non-face-to-face work environment that can contribute to satisfying employees' work-life balance needs and improving industrial productivity, it is possible to reflect the characteristics of each company, and also ensure fair work evaluation by strengthening the accuracy and reliability of work evaluation for individual employees.

In addition, according to the present disclosure, by providing work evaluation results visualized in a 3-axis graph and numerical values, it is possible to increase employees' understanding of work evaluation results and encourage employees to change into the company-customized ideal talent.

BRIEF DESCRIPTION OF THE DRAWINGS

FIG. 12 is an exemplary diagram showing work sincerity data for September and October of Employee 1 to Employee 3.

FIG. 13 is an exemplary diagram showing the preprocessed TNM values of FIG. 12.

FIG. 14 is an exemplary diagram showing a process of normalizing the preprocessed TNM values of FIG. 13.

FIG. 16 is an exemplary diagram showing normalization-applying criteria for two-month work sincerity data of Employee 1 to Employee 3.

FIG. 17 is an exemplary diagram showing normalized TNM values calculated by applying the normalization-applying criteria of FIG. 16.

FIG. 19 is an exemplary diagram showing improvement scores of Employee 1 to Employee 3.

DETAILED DESCRIPTION

Figure 1:
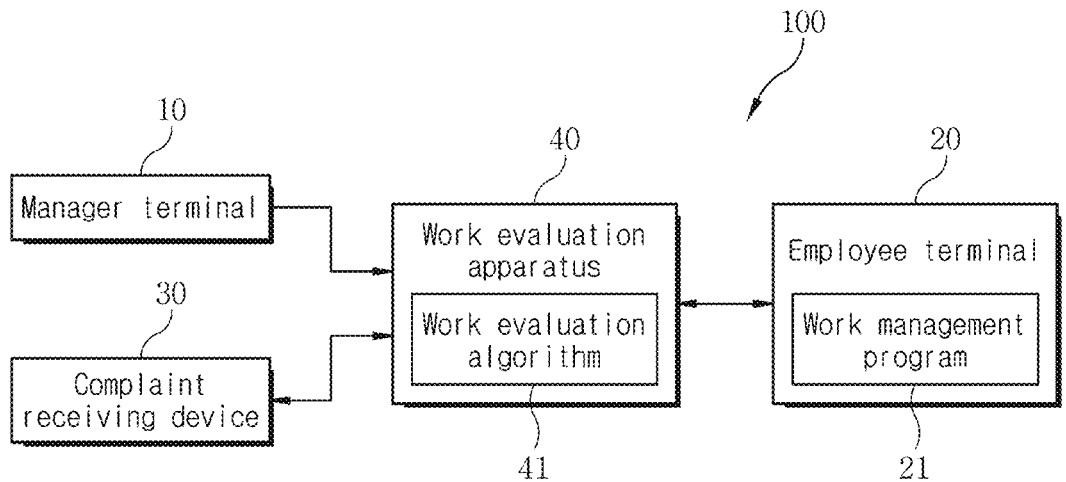
FIG. 1 is a block diagram showing a company-customized work evaluation system based on work sincerity and work concentration according to an embodiment of the present disclosure.

Even amid social crises such as COVID-19, many companies are escaping time and space constraints, increasing labor productivity, and demanding a convenient and efficient work environment, which is a major change in the work style of the times. It is analyzed that the change in consciousness of the younger generation, which prefers a horizontal company culture that reduces the number of face-to-face reports during work and uses communication through chatting, video calls, and video conferences, has also had a significant impact on the change in non-face-to-face work patterns.

As the proportion of non-face-to-face work continues to increase, opportunities and times for employees to closely observe each other while performing work together are gradually decreasing. Accordingly, many problems are occurring as evaluators (managers) perform employee work evaluations based on preconceived notions about existing employees (evaluated employees) and ignorance of new employees.

Since a typical work evaluation of an employee includes subjective or emotional evaluations such as the evaluator's bias of opinion, there is a possibility of error in the evaluation of the employee.

Because the work evaluation of employees was focused on relative evaluation for individual monitoring or disciplinary action, it was far from numerical evaluation, objective evaluation, and systematic evaluation that could ensure fair work evaluation.

In addition, because the company's attributes (industrial characteristics, size, form, etc.) were not reflected in the work evaluation of employees, and only a simple work evaluation was performed based on evaluation items, it was not possible to perform a customized work evaluation for each company.

Now, embodiments of the present disclosure will be described in detail with reference to the accompanying drawings. However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

FIG. 1 is a block diagram showing a company-customized work evaluation system based on work sincerity and work concentration according to an embodiment of the present disclosure.

Referring to FIG. 1, the company-customized work evaluation system based on work sincerity and work concentration according to an embodiment (hereinafter, referred to as the work evaluation system 100) is a system for conducting a company-customized work evaluation of employees based on work sincerity and work concentration to induce employees toward the ideal talent pursued by the company.

The work evaluation system 100 includes a manager terminal 10, a plurality of employee terminals 20, and a work evaluation apparatus 40. The manager terminal 10 transmits, to the work evaluation apparatus 40, setting values for work sincerity and work concentration each including a plurality of evaluation items, setting values for weights for the respective evaluation items, and setting values for satisfaction/violation conditions. Each of the plurality of employee terminals 20 transmits, to the work evaluation apparatus 40, data on work sincerity and work concentration obtained by collecting and counting event information on satisfaction/violation for each evaluation item according to the employee's work. In addition, the work evaluation apparatus 40 performs work evaluation on a plurality of employees via a work evaluation algorithm 41 based on the work sincerity and work concentration data and related weights. At this time, the work evaluation apparatus 40 performs such work evaluation for each individual employee. Also, the work evaluation apparatus 40 performs an integrated work evaluation by applying an integrated weight to the work evaluation based on work sincerity and the work evaluation based on work concentration.

The work evaluation system 100 may further include a complaint receiving device 30. The complaint receiving device 30 is a device that receives and manages complaints about the company. The civil complaint receiving device 30 may count the number of complaints triggered by each employee among the received complaints and provide it to the manager terminal 10 or the work evaluation apparatus 40. The complaint receiving device 30 may be a server or cloud server implemented on a network, etc.

The manager terminal 10 is a communication terminal used by a manager who performs a management task related to personnel evaluation of employees in a company. The manager terminal 10 can access the work evaluation apparatus 40 and input setting values related to the work evaluation of employees. The manage terminal 10 may be a personal computing system such as a smartphone, laptop, desktop, handheld PC, or tablet PC.

The evaluation items included in work sincerity may include compliance with commuting time, the number of times of tardiness, the number of times of early leaving, the number of times of absenteeism without notice, the number of times schedules (deadlines) are not met, and the number of complaints triggered.

The evaluation items included in work concentration may include the number and time of use of work-unrelated apps, the number and time of use of work-related apps, and the number of negative evaluations and reports by managers/colleagues.

The manager terminal 10 may set in advance the weight for each evaluation item and the satisfaction/violation conditions (commuting standard time, early leaving standard time, etc.) in the work evaluation apparatus 40 according to the characteristics of the company (by industry, size, type, etc.).

The employee terminal 20 is a communication terminal used by each employee to perform work. The employee terminal 20 may be a personal computing system such as a smartphone, laptop, desktop, handheld PC, or tablet PC.

The employee terminal 20 collects work sincerity and work concentration data necessary for evaluating the employee's work and transmits it to the work evaluation apparatus 40. Each employee can access the work evaluation apparatus 40 through the employee terminal 20 and check the work evaluation results.

The employee terminal 20 is equipped with a work management program 21 to collect work sincerity and work concentration data. The work management program 21 generates work sincerity and work concentration data obtained by collecting and counting event information on satisfaction/violation for each evaluation item. That is, based on the first/last use time of the employee terminal 20, the first/last use time of the work management program 21, the network access time within the company, the vehicle departure recognition information (optional), and the like, the work management program 21 monitors events such as whether the employee complies with the commuting time, is tardy, leaves early, is absent without notice, and meets/violates the schedule (deadline). Then, the work management program 21 collects and counts generated event information, processes it into work sincerity data, and transmits it to the work evaluation apparatus 40.

In addition, based on the first/last use time of the employee terminal 20, the first/last use time of the work management program, the first/last use time of the work-unrelated program, the network access time within the company, and the receipt of negative evaluations/reports, the work management program 21 monitors events regarding the number and time of use of work-unrelated apps, the number and time of use of work-related apps, and the number of negative evaluations and reports by managers/colleagues. Then, the work management program 21 collects and counts generated event information, processes it into work concentration data, and transmits it to the work evaluation apparatus 40.

The number of complaints triggered among the work sincerity data and the number of negative evaluations and reports by managers/colleagues among the work concentration data may be entered for each employee by the manager through the manager terminal 10 or provided from the complaint reception device 30 through interworking with the complaint reception device 30.

In addition, the work evaluation apparatus 40 performs work evaluation of employees based on work sincerity, work concentration, and weight. That is, the work evaluation apparatus 40 performs work evaluation on a plurality of employees via the work evaluation algorithm 41 that uses work sincerity and work concentration data and weights as input values. The work evaluation apparatus 40 may be a server or cloud server implemented on a network, etc.

When performing work evaluation, the work evaluation apparatus 40 first performs each of work evaluation based on work sincerity and work evaluation based on work concentration through the work evaluation algorithm 41 that uses work sincerity and work concentration data and weights as input values. In addition, the work evaluation apparatus 40 performs an integrated work evaluation by applying an integrated weight to the work evaluation based on work sincerity and the work evaluation based on work concentration.

The work evaluation apparatus 40 may provide work evaluation results to the employee terminal 20 or the manager terminal 10. Additionally, the work evaluation results may be viewed on the employee terminal 20 and the manager terminal 10. When providing the work evaluation results, the work evaluation apparatus 40 may visualize the employee's current evaluation results, improvement direction for the evaluation results, and improvement rate information on accumulated evaluation results, based on a 3-axis graph and numerical values (scores).

As such, because the requirements for employees (ideal talent) pursued by each company vary depending on the industry, size, and type to which the company belongs, the work evaluation system 100 according to the embodiment supports training of talent tailored to each company by adjusting the evaluation items for work sincerity and work concentration and adjusting the weights of the evaluation items.

The work evaluation system 100 according to the embodiment supports solving problems of subjective or emotional work evaluation, such as the concentration of opinions of the evaluator (manager) on the evaluated person (employee) during the company's process of evaluating the employee's work, and also supports fair work evaluation such as objective evaluation and systematic evaluation.

The work evaluation system 100 according to the embodiment does not focus on relative evaluation for surveilling or disciplining individual employees, but rather sets the evaluation items and weights for work sincerity and work concentration based on the unique characteristics of the company and thereby establishes the most optimal customized talent for the company. The work evaluation system 100 according to the embodiment performs work evaluations on employees based on the set evaluation items and weights for work sincerity and work concentration, and provides the employees with information about the employee's current evaluation position, improvement direction, and improvement rate based on the work evaluation results.

Figure 2:
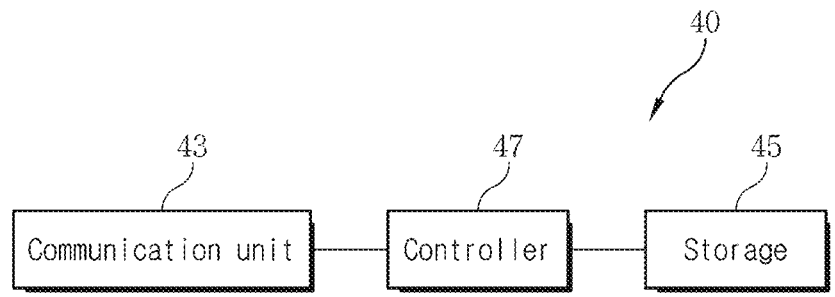
FIG. 2 is a block diagram showing the work evaluation apparatus of FIG. 1.

Hereinafter, the work evaluation apparatus 40 according to the embodiment will be described in detail with reference to FIGS. 1 and 2. FIG. 2 is a block diagram showing the work evaluation apparatus 40 of FIG. 1.

The work evaluation apparatus 40 according to the embodiment includes a communication unit 43 and a controller 47. In addition, the work evaluation apparatus 40 according to the embodiment may further include a storage 45.

The communication unit 43 communicates with the manager terminal 10 and the plurality of employee terminals 20. The communication unit 43 can communicate with the complaint receiving device 30. The communication unit 43 may receive data on the number of complaints triggered from the complaint receiving device 30.

The storage 45 stores a program necessary for controlling the operation of the work evaluation apparatus 40 and data generated during execution of the program. The storage 45 stores the work evaluation algorithm 41 for performing work evaluation, and the work evaluation results obtained from the work evaluation algorithm 41. The storage 45 stores setting values for work sincerity and work concentration each including a plurality of evaluation items, setting values for weights for the respective evaluation items, setting values for satisfaction/violation conditions, work sincerity data, work concentration data, and an integrated weight.

The controller 47 is a microprocessor that performs the overall control of the work evaluation apparatus 40. The controller 47 performs work evaluation on employees via the work evaluation algorithm 41. Specifically, the controller 47 receives an input of setting values for work sincerity and work concentration each including a plurality of evaluation items, setting values for weights for the respective evaluation items, and setting values for satisfaction/violation conditions. In addition, the controller 47 receives data on work sincerity and work concentration obtained by collecting and counting event information on satisfaction/violation for each evaluation item according to the employee's work from the plurality of employee terminals 20. In addition, the controller 47 performs work evaluation on a plurality of employees via the work evaluation algorithm 41 that uses the work sincerity and work concentration data and weights as input values.

The work evaluation algorithm 41 performs work evaluation on a plurality of employees, based on a TNM value (TNM_WES) calculated by applying a plurality of evaluation influence factors including a violation time (T), a violation number (N), and a violation magnitude (M) for each evaluation item, and weights assigned to the plurality of evaluation influence factors.

The violation time (T) is an evaluation influence factor for when an employee most recently committed a violation. The violation number (N) is an evaluation influence factor for how often an employee commits a violation. The violation magnitude (M) is an evaluation influence factor for the degree (magnitude) of the employee's violation.

When calculating the TNM value using the work evaluation algorithm 41, a weight may be set for at least one of each evaluation item and each evaluation influence factor. That is, the weight includes a weight for each evaluation influence factor and a weight for each evaluation item.

The TNM value can be calculated using Equation 1 below.

$$TNM\_WES \text{ (Work Evaluation Score)} = (w1*(w11*aT + w12*bT + \ldots w15eT)) + (w2*(w21*aN + w22*bN + \ldots w25eN)) + (w3*(w31*aM + w33*bM + \ldots w35eM)) \quad \text{EQUATION 1}$$

T: Time of violation
N: Number of violations
M: Magnitude of violation
aT: Violation time of commute
aN: Violation number of commute
aM: Violation magnitude of commute
bT: Violation time of early leaving
bN: Violation number of early leaving
bM: Violation magnitude of early leaving
cT: Violation time of absenteeism
cN: Violation number of absenteeism
cM: Violation magnitude of absenteeism
dT: Violation time of schedule or deadline
dN: Violation number of schedule or deadline
dM: Violation magnitude of schedule or deadline
eT: Violation time of complaint (occurrence)
eN: Violation number of complaint (occurrence)
eM: Violation magnitude of complaint (occurrence)
w1~w3: Weights for evaluation influence factors (violation time, violation number, and violation magnitude)
w11~w35: Weights for evaluation items In evaluating an employee's work, it is intuitive that the larger the number of violations (N) and the magnitude of the violation (M), the worse it is. However, since the time of violation (T) regards recent violations as worse, the lower the value, the worse the evaluation. Therefore, in order to unify the meaning of the violation number (N) and violation magnitude (M) values and the meaning of the violation time (T) value, the controller 47 performs preprocessing on the violation time (T) value as follows. That is, the controller 47 calculates the TNM value for each particular period, and in order to unify the value of the violation time (T) with other values, the controller 47 preprocesses the most recent violation date, used as the violation time (T), based on the last day of the particular period to count the days by using the start date of the particular period as the 1st.

The violation time (T), violation number (N), and violation magnitude (M), which are the evaluation influence factors of the TNM value, all have different numerical structures because they are measured in different ways. Therefore, in order to perform a sophisticated work evaluation based on the TNM value, the controller 47 performs a normalization process for each evaluation influence factor. Specifically, the controller 47 normalizes the preprocessed TNM values for each evaluation influence factor and calculates the normalized TNM values. That is, the controller 47 defines a plurality of levels for each evaluation influence factor and sets normal values differentially for the plurality of levels. Then, the controller 47 identifies the minimum and maximum values for the values calculated for each evaluation influence factor, and divides a difference value between the identified minimum and maximum values into a plurality of values corresponding to the plurality of levels. Then, the controller 47 normalizes the preprocessed TNM values to the normal value of the plurality of corresponding levels and calculates the normalized TNM values.

When dividing the difference value into the plurality of levels, equal division or differential division according to levels is possible.

When providing the work evaluation results based on the normalized TNM values, the controller 47 provides visualization along with numerical values. That is, the controller 47 may provide the normalized TNM values visualized as a three-axis graph using the violation time (T), violation number (N), and violation magnitude (M) as axes.

The controller 47 may divide a particular period into a plurality of unit periods, calculate normalized TNM values for each unit period, and provide information about the degree of improvement in work evaluation through changes in the normalized TNM values for each unit period. Here, the particular period may be weekly, monthly, quarterly, semi-annually, or annually.

When providing the work evaluation results based on the normalized TNM values, the controller 47 may calculate an improvement score (IS) as shown in Equation 2 to provide an improvement rate. That is, the controller 47 may convert the normalized TNM value into a coordinate position of (T, N, M) and calculate a distance (d) between the coordinate positions in two unit periods as the improvement score.

$$\text{IS(ImprovementScore)} = \sqrt{(t2-t1)^2 + (n2-n1)^2 + (m2-m1)^2} \quad \text{EQUATION 2}$$

The two unit periods are a first unit period and a second unit period, a first coordinate position of the first unit period is (t1, n1, m1), and a second coordinate position of the second unit period is (t2, n2, m2). The second unit period is a period later in time than the first unit period.

Figure 3:
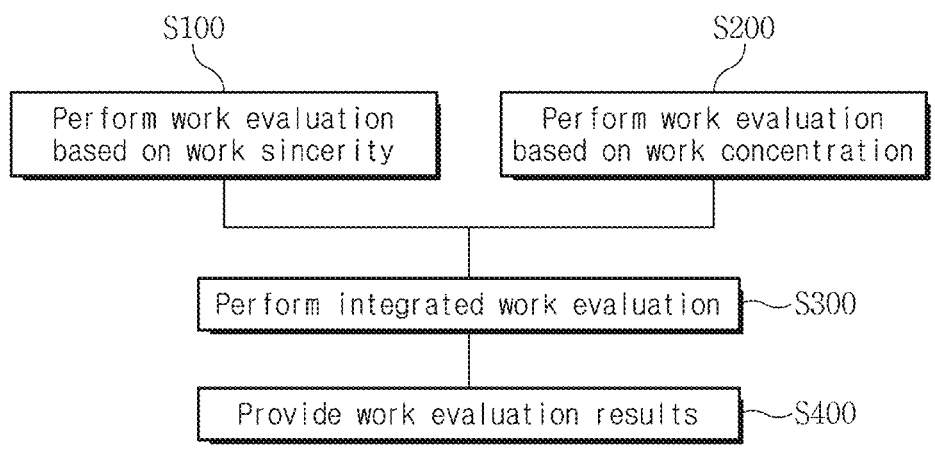
FIG. 3 is a flowchart showing a company-customized work evaluation method based on work sincerity and work concentration according to an embodiment of the present disclosure.

Hereinafter, a company-customized work evaluation method based on work sincerity and work concentration according to the embodiment will be described in detail with reference to FIGS. 1 to 3. FIG. 3 is a flowchart showing a company-customized work evaluation method based on work sincerity and work concentration according to an embodiment of the present disclosure.

First, the work evaluation apparatus 40 performs a work evaluation S100 based on work sincerity and a work evaluation S200 based on work concentration. At this time, the work evaluation apparatus 40 may perform steps S100 and S200 simultaneously.

Meanwhile, the work evaluation apparatus 40 may sequentially perform steps S100 and S200. For example, step S200 may be performed after step S100, or conversely, step S100 may be performed after step S200.

Subsequently, in step S300, the work evaluation apparatus 40 performs an integrated work evaluation by applying an integrated weight to the work evaluation based on work sincerity and the work evaluation based on work concentration.

An integrated work evaluation score can be calculated using Equation 3 below.

$$\text{Integrated work evaluation} = \text{work evaluation based on work sincerity} \times \alpha + \text{work evaluation based on work concentration} \times \beta \quad \text{EQUATION 3}$$

α: first integrated weight
β: second integrated weight

For example, assume that the work evaluation score based on work sincerity is 90 points and the work evaluation score based on work concentration is 80 points. If the first integrated weight for work sincerity is 0.6 which is set higher than the second integrated weight for work concentration of 0.4, the integrated work evaluation score is calculated as 86 points. Conversely, if the first integrated weight is 0.4 which is set lower than the second integrated weight of 0.6, the integrated work evaluation score is calculated as 84 points.

As described above, by setting the evaluation items for work sincerity and work concentration according to the characteristics of each company (by industry, size, type, etc.) and setting related weights for each company, the work evaluation apparatus 40 can perform a company-customized work evaluation.

Then, in step S400, the work evaluation apparatus 40 provides work evaluation results to the manager terminal 10 or the employee terminal 20. At this time, the work evaluation apparatus 40 may provide the work evaluation results visualized in a three-axis graph and numerical values. Here, the numerical values may include the TNM values and the improvement score according to Equation 2.

Figure 4:
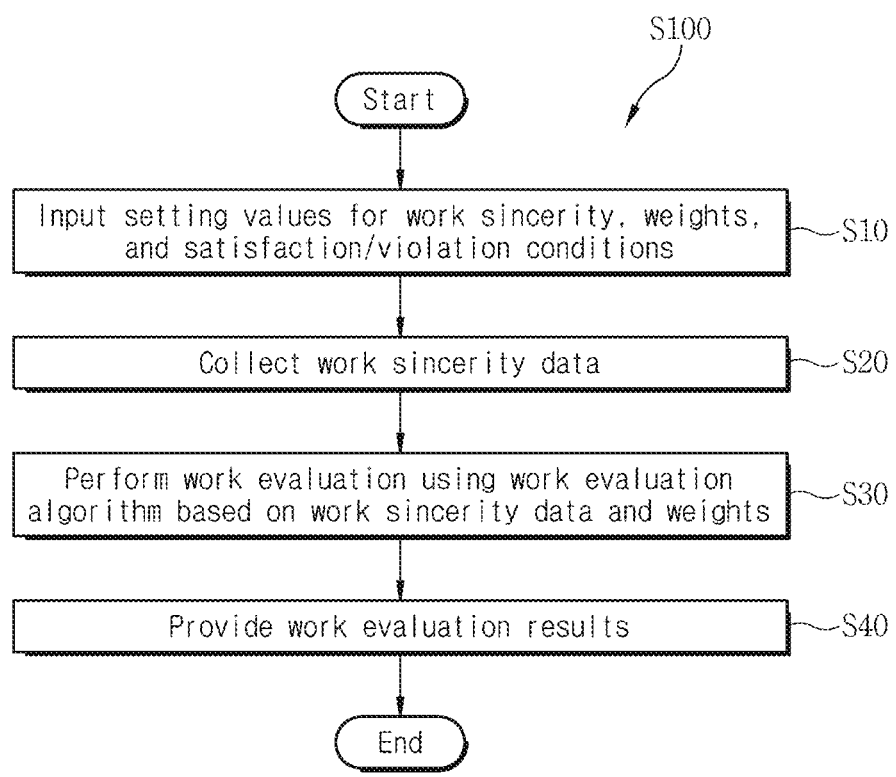
FIG. 4 is a detailed flowchart showing the step of company-customized work evaluation based on work sincerity shown in FIG. 3.
Figure 5:
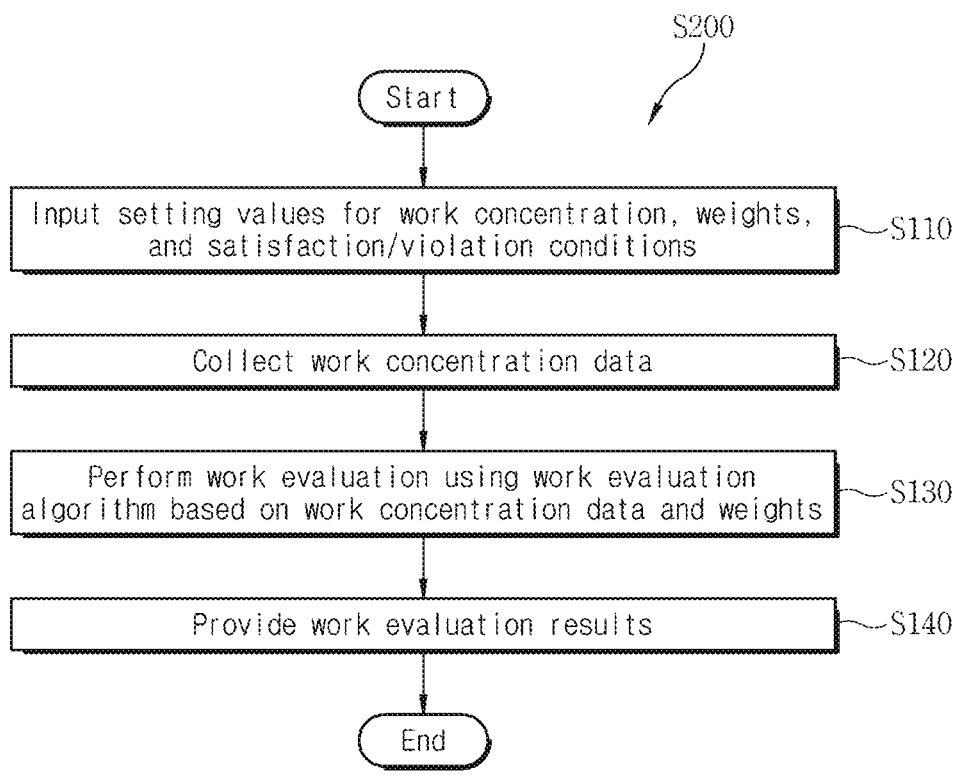
FIG. 5 is a detailed flowchart showing the step of company-customized work evaluation based on work concentration shown in FIG. 3.

Detailed processes for steps S100 and S200 will be described with reference to FIGS. 1 and 3 to 5. FIG. 4 is a detailed flowchart showing the step of company-customized work evaluation based on work sincerity shown in FIG. 3. FIG. 5 is a detailed flowchart showing the step of company-customized work evaluation based on work concentration shown in FIG. 3.

As shown in FIG. 4, the work evaluation based on work sincerity in the step S100 includes a step S10 of receiving an input of setting values for work sincerity, for weights, and for satisfaction/violation conditions, a step S20 of collecting work sincerity data, a step S30 of performing a work evaluation using the work evaluation algorithm 41 based on the work sincerity data and weights, and a step S40 of providing work evaluation results.

As shown in FIG. 5, the work evaluation based on work concentration in the step S200 includes a step S110 of receiving an input of setting values for work concentration, for weights, and for satisfaction/violation conditions, a step S120 of collecting work concentration data, a step S130 of performing a work evaluation using the work evaluation algorithm 41 based on the work concentration data and weights, and a step S140 of providing work evaluation results.

As such, the detailed processes of the S100 and S200 steps are substantially the same, except that the S100 step is based on work sincerity and the S200 step is based on work concentration. Therefore, the following description will focus on the step S100.

First, in the step S10, the work evaluation apparatus 40 receives, as an input, setting values for work sincerity, for weights, and for satisfaction/violation conditions. That is, the work evaluation apparatus 40 receives, from the manager terminal 10, setting values for work sincerity including a plurality of evaluation items, setting values for weights for the respective evaluation items, and setting values for satisfaction/violation conditions.

Next, in the step S20, the work evaluation apparatus 40 collects work sincerity data. Specifically, the work evaluation apparatus 40 acquires work sincerity data by collecting and counting event information on satisfaction/violation for each evaluation item according to the work of a plurality of employees from a plurality of employee terminals 20.

Subsequently, in step S30, the work evaluation apparatus 40 performs work evaluation using the work evaluation algorithm 41 based on the work sincerity data and the weights. Specifically, the work evaluation apparatus 40 calculates the TNM value using Equation 1, then performs preprocessing and normalization on the calculated TNM value, thereby completing the work evaluation for the employee.

Additionally, in step S40, the work evaluation apparatus 40 provides the work evaluation results to the manager terminal 10 or the employee terminal 20. At this time, the work evaluation apparatus 40 may provide the work evaluation results visualized in a three-axis graph and numerical values. Here, the numerical values may include the TNM value and the improvement score according to Equation 2.

The work evaluation method centered on work sincerity according to the embodiment will be described through specific application examples according to FIGS. 6 to 20.

To support the customized work evaluation based on company characteristics, the embodiment proposes the work evaluation algorithm 41 according to Equation 1 in which weights of the evaluation influence factors are set and applied by being linked with the ideal talent pursued by the company.

The work evaluation algorithm 41 performs a work evaluation for employees based on the TNM value calculated by assigning a weight (w) to each evaluation influence factor. The premise of the work evaluation for employees is that they must comply with the commuting time and perform work at the appointed time. Therefore, an event is granted in case of a violation where the event occurrence/count criteria do not meet the conditions. In other words, the work evaluation for employees is conducted with a focus on what has not been achieved (not fulfilled).

Hereinafter, the calculation of TNM value according to Equation 1 will be described using an example. To simplify the explanation, the commute which is one of the evaluation items of work integrity will be described for example. Assume that the company has three employees to be evaluated. Each employee uses the employee terminal 20 equipped with the work management program 21. The manager sets work integrity satisfaction/violation conditions in advance in the work evaluation apparatus 40 through the manager terminal 10. The manager sets the weight to "1" in advance in the work evaluation apparatus 40 through the manager terminal 10.

TABLE 1

| Schedule No. | Schedule | Start time | End time | State |
|---|---|---|---|---|
| 1 | Confirm attendance | 09:00 | 10:00 | Observation of non-achievement |
| 2 | Work in progress | 09:00 | 12:00 | Real-time observation of non-achievement |
| 3 | Lunch hour | 12:00 | 13:00 | Clear all observation states |
| 4 | Work in progress | 13:00 | 18:00 | Real-time observation of non-achievement |
| 5 | Leave work | 18:00 | 09:00 | Clear all observation states |

TABLE 2

| Non-achievement time range | Score |
|---|---|
| 00:05~00:10 | 2 |
| 00:11~00:20 | 4 |
| 00:21~00:30 | 6 |
| 00:31~00:40 | 8 |
| 00:41~00:50 | 10 |
| 00:51~ | 15 |

Table 1 and Table 2 show the main schedule for daily work sincerity observation set in advance by the manager and the scores given in case of violation. The scores are randomly assigned according to the range of time not achieved. Here, the score is not a score in a positive sense, but a score for a negative violation. If an employee comes to work at 9:45, the score given is 10 points because it falls within the non-achievement time range of 00:41 to 00:50. If an employee logs out for 20 minutes from 14:00 to 14:20 and leaves his/her position without permission, the employee will be given 4 points corresponding to time range 00:11 to 00:20. Of course, the schedule and score table shown in Tables 1 and 2 can be variably applied depending on the characteristics of each company.

The work management program 21 installed in the employee terminal 20 stores and manages employee's work sincerity data on a daily basis and transmits it to the work evaluation apparatus 40. For example, such work sincerity data is shown in Table 3.

TABLE 3

| Record No | Employee name | Start time | End time | Observation record | Score |
|---|---|---|---|---|---|
| 1 | Employee 1 | 09:00 | 09:05 | Tardy | 2 |
|  |  | 13:05 | 13:20 | Leave seat | 4 |

TNM Value Calculation

Figure 6:
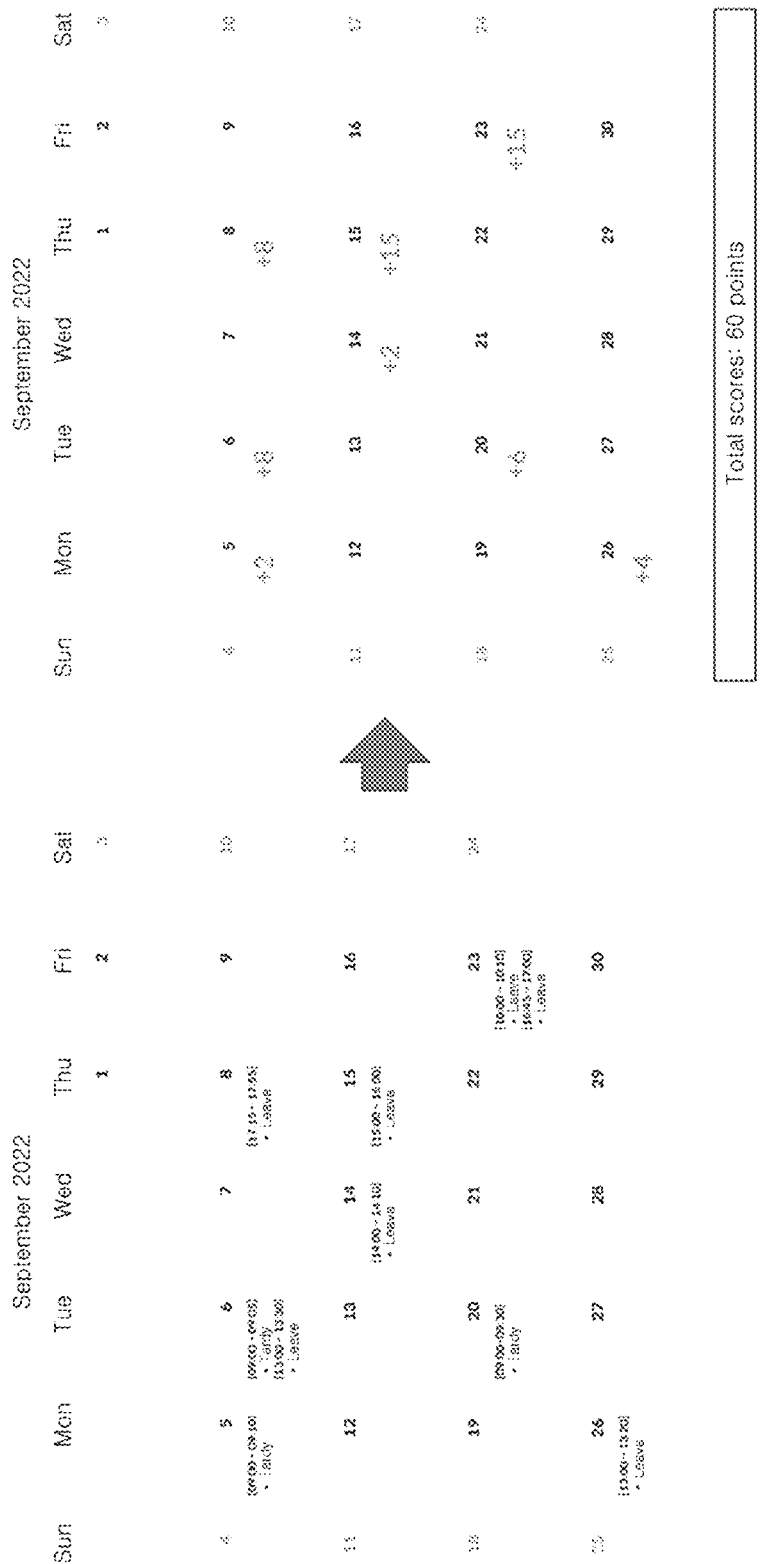
FIG. 6 is an exemplary diagram showing a process of converting Employee 1's work sincerity data into scores.

As shown in FIG. 6, the work sincerity data for Employee 1 collected on a daily basis is converted into scores and managed as monthly work sincerity data. The work evaluation apparatus 40 performs scoring based on the score table shown in Table 2 and calculates the sum (total score). FIG. 6 is an exemplary diagram showing a process of converting Employee 1's work sincerity data into scores.

From now on, a process of applying the work evaluation algorithm 41 according to Equation 1 to the collected work sincerity data will be described. The evaluation influence factor of the TNM value for a specific employee's monthly work sincerity data is created based on the following criteria.

Figure 7:
FIG. 7 is an exemplary diagram showing TNM values calculated by applying a TNM model to the work sincerity data of FIG. 6.

T: Time of violation, i.e., a difference between the end of the month or work evaluation date and the non-achievement record date N: Number of violations, i.e., the number of monthly non-achievement records M: Magnitude of violation, i.e., total monthly work sincerity score Based on such criteria, the monthly work sincerity for Employee 1 is converted as shown in FIG. 7. FIG. 7 is an exemplary diagram showing TNM values calculated by applying a TNM model to the work sincerity data of FIG. 6.

Referring to FIG. 7, the Employee 1's values for violation time (T), violation number (N), and violation magnitude (M) are 5 days, 8 days, and 60 points, respectively.

TNM Value Preprocessing

Figure 8:
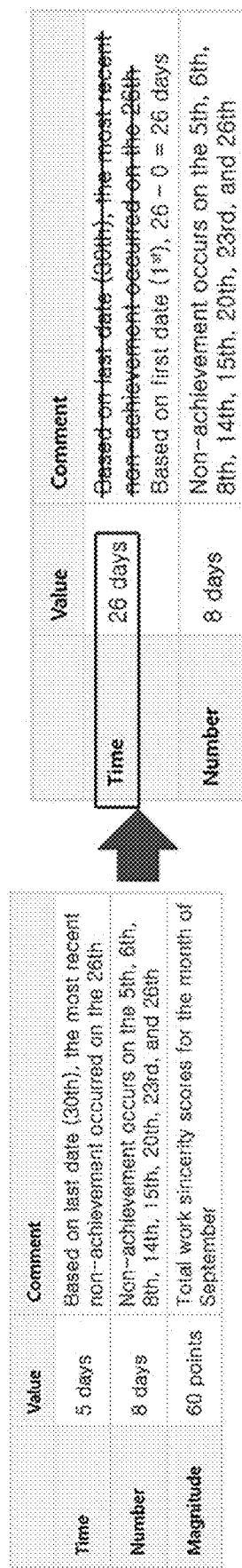
FIG. 8 is an exemplary diagram showing results of preprocessing the TNM values of FIG. 5.

FIG. 8 is an exemplary diagram showing results of preprocessing the TNM values of FIG. 5.

In evaluating an employee's work, it is intuitive that the larger the number of violations (N) and the magnitude of the violation (M), the worse it is. However, since the time of violation (T) regards recent violations as worse, the lower the value, the worse the evaluation. Therefore, as shown in FIG. 8, in order to unify the meaning of the violation number (N) and violation magnitude (M) values and the meaning of the violation time (T) value, the work evaluation apparatus 40 uses a preprocessing method.

For example, the most recent violation time, which has been calculated based on the last day of September when the work evaluation is in progress, is calculated again from the start day, September 1st, by preprocessing. As a result, the violation time (T) value before preprocessing, 5 days (FIG. 5), is changed to 26 days (FIG. 6), which is the violation time (T) value after preprocessing.

Through this process, the Employee 1's monthly preprocessed TNM value is calculated as 94 points (26(T)+8(N)+60(M)).

Figure 9:
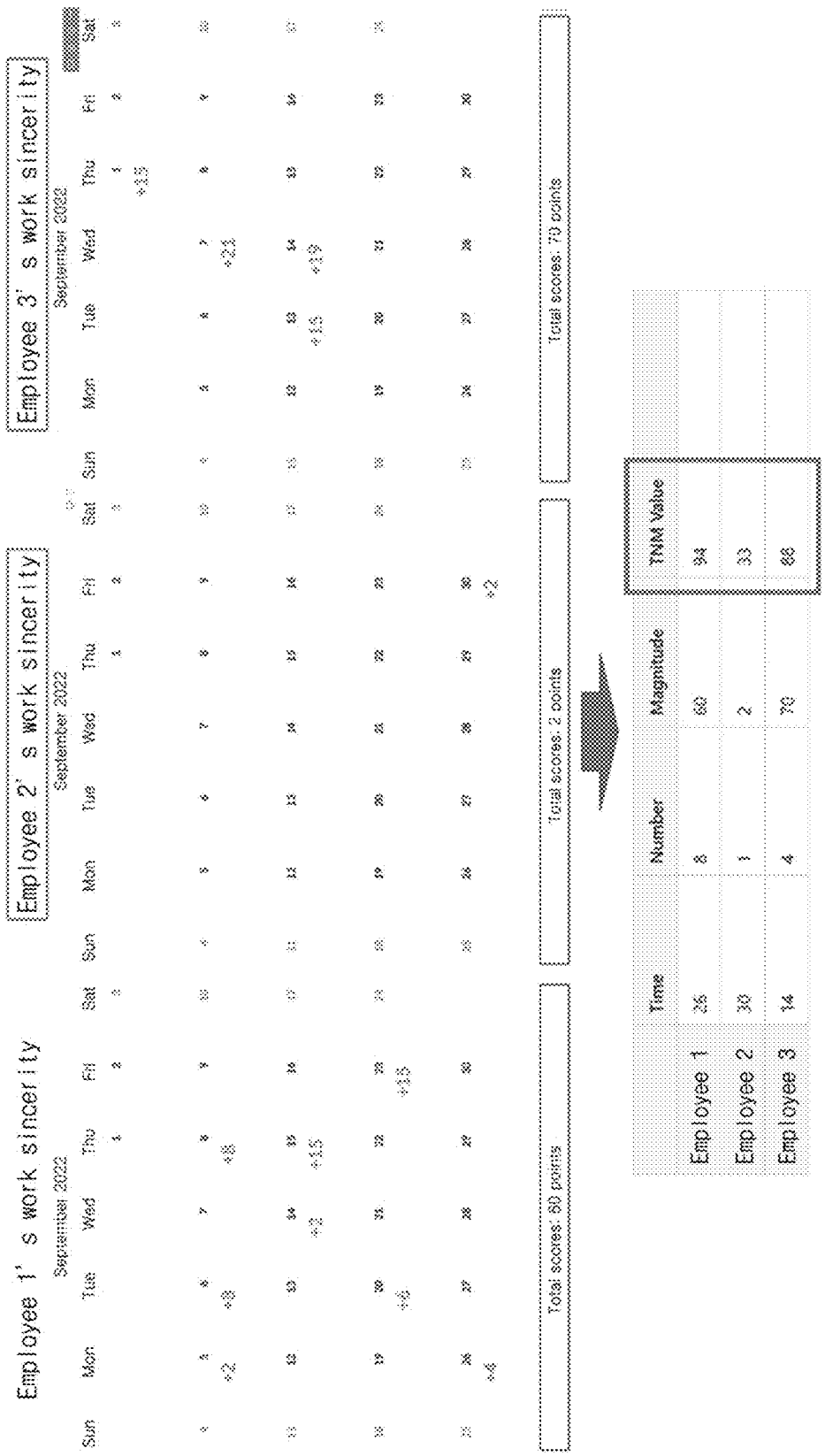
FIG. 9 is an exemplary diagram showing TNM values preprocessed by applying a TNM model to the work sincerity data of Employee 1 to Employee 3.

In order to verify whether there is a contradiction in the meaning of the TNM value calculated for Employee 1, Employee 2 and Employee 3 are additionally examined as shown in FIG. 9. FIG. 9 is an exemplary diagram showing TNM values preprocessed by applying a TNM model to the work sincerity data of Employee 1 to Employee 3.

Referring to FIG. 9, when a work evaluation is simply performed based on work sincerity data, Employee 3's work sincerity score is basically calculated to be the worst. Employee 2 is evaluated as the best employee. However, after conversion into TNM values, it can be seen that the ranks of Employee 1 and Employee 3 are changed. It can be intuitively seen that there are many more cases of commute violations by Employee 1.

Meanwhile, the weight value of each item can be adjusted and managed for each company. In the description according to the embodiment, the meaning of excellent employee is only an example. Depending on the interpretation of the TNM value, different analysis results may be derived.

Normalization of Preprocessed TNM Values

Figure 10:
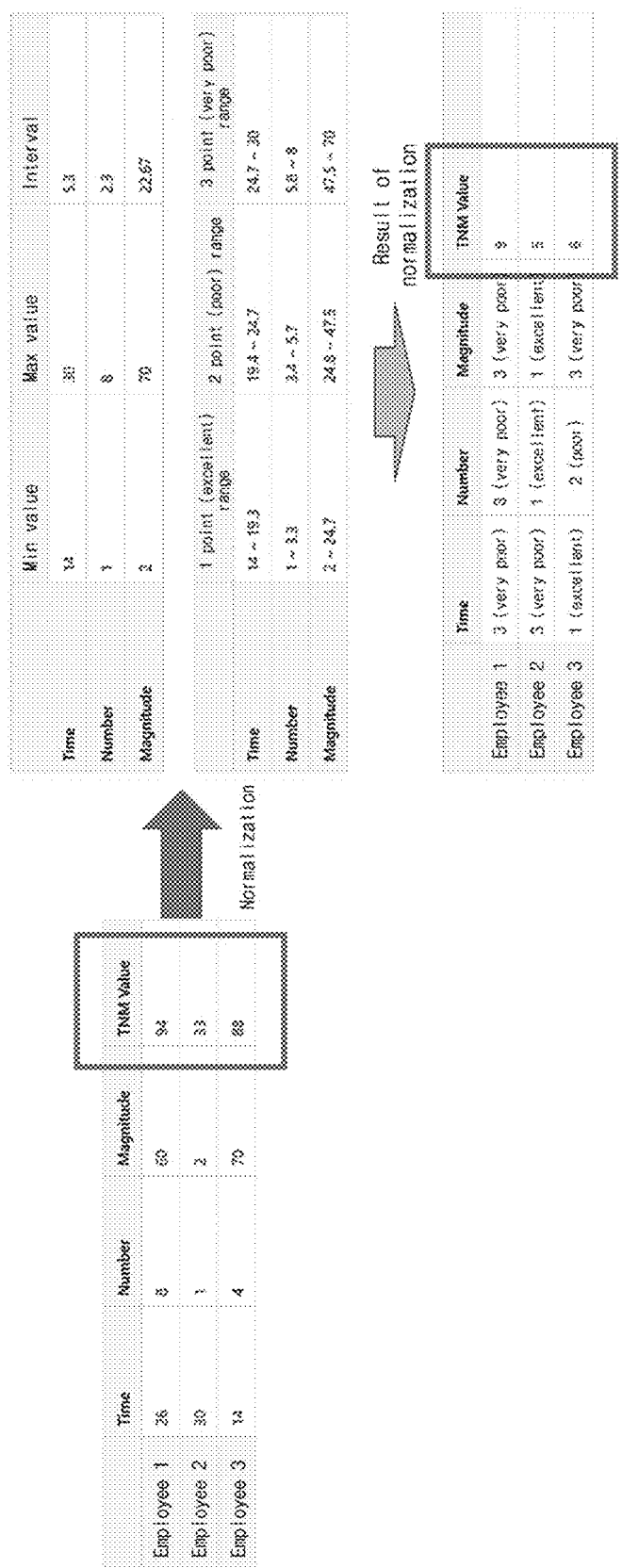
FIG. 10 is an exemplary diagram showing a process of normalizing the preprocessed TNM values of FIG. 9.

The work evaluation apparatus 40 performs a normalization process on the preprocessed TNM values. In other words, the violation time (T), violation number (N), and violation magnitude (M), which are the evaluation influence factors of the TNM values, all have different numerical structures because they are measured in different ways. Therefore, in order to perform a sophisticated work evaluation based on the TNM values, the work evaluation apparatus 40 performs a normalization process for each evaluation influence factor, as shown in FIG. 10. FIG. 10 is an exemplary diagram showing a process of normalizing the preprocessed TNM values of FIG. 9.

Referring to FIG. 10, in the normalization process, normal values are classified into three levels: excellent (1 point), poor (2 points), and very poor (3 points). In the normalization process, the difference between the minimum and maximum values is divided into three equal intervals, which are then matched to three levels, respectively. Then, the work evaluation apparatus 40 calculates the normalized TNM value by normalizing the preprocessed TNM value to a corresponding normal value of a plurality of levels.

Visualization

Figure 11:
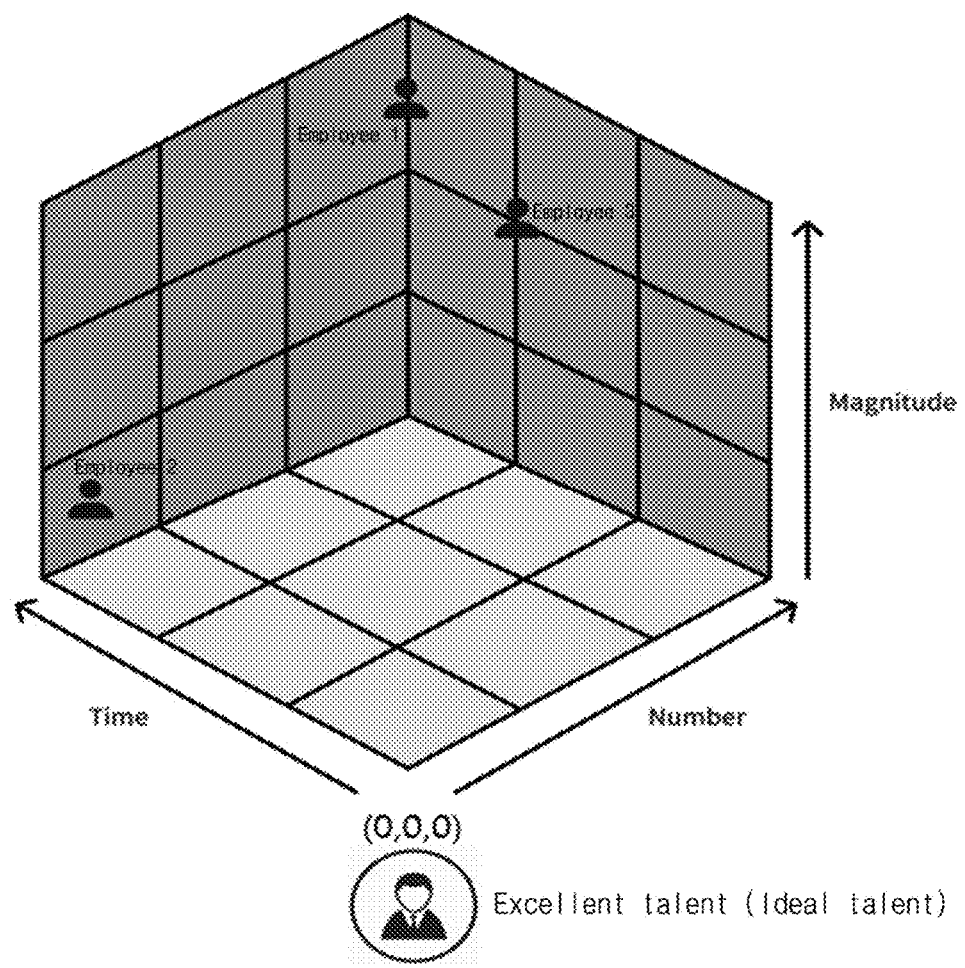
FIG. 11 is an exemplary diagram showing results of displaying the normalized TNM values of FIG. 10 on a three-axis graph.

The work evaluation apparatus 40 performs a visualization process as shown in FIG. 11 to support more intuitive recognition of the work evaluation results based on the normalized TNM values. FIG. 11 is an exemplary diagram showing results of displaying the normalized TNM values of FIG. 10 on a three-axis graph.

Referring to FIG. 11, the work evaluation apparatus 40 visualizes the normalized TNM values of Employee 1, Employee 2, and Employee 3 by displaying them on a three-axis graph. That is, the work evaluation apparatus 40 visualizes the normalized TNM values as a three-axis graph with the violation time (T), violation number (N), and violation magnitude (M) as axes.

In the three-axis graph, the normalized TNM values of Employee 1, Employee 2, and Employee 3 are represented as coordinates. At this time, the coordinates of (0, 0, 0) in the three-axis graph represent the excellent talent (ideal talent) pursued by the company.

An employee or a manager can intuitively recognize the work evaluation results by comparing his/her or other employee's coordinates with the coordinates of excellent talent on the 3-axis graph.

The work evaluation method according to the embodiment provides a guide service to help employees develop into the ideal talent desired by the company through fair and reasonable systematic work evaluation. Therefore, the work evaluation method according to the embodiment presents a way to easily identify the improvement status of employees.

Figure 12:
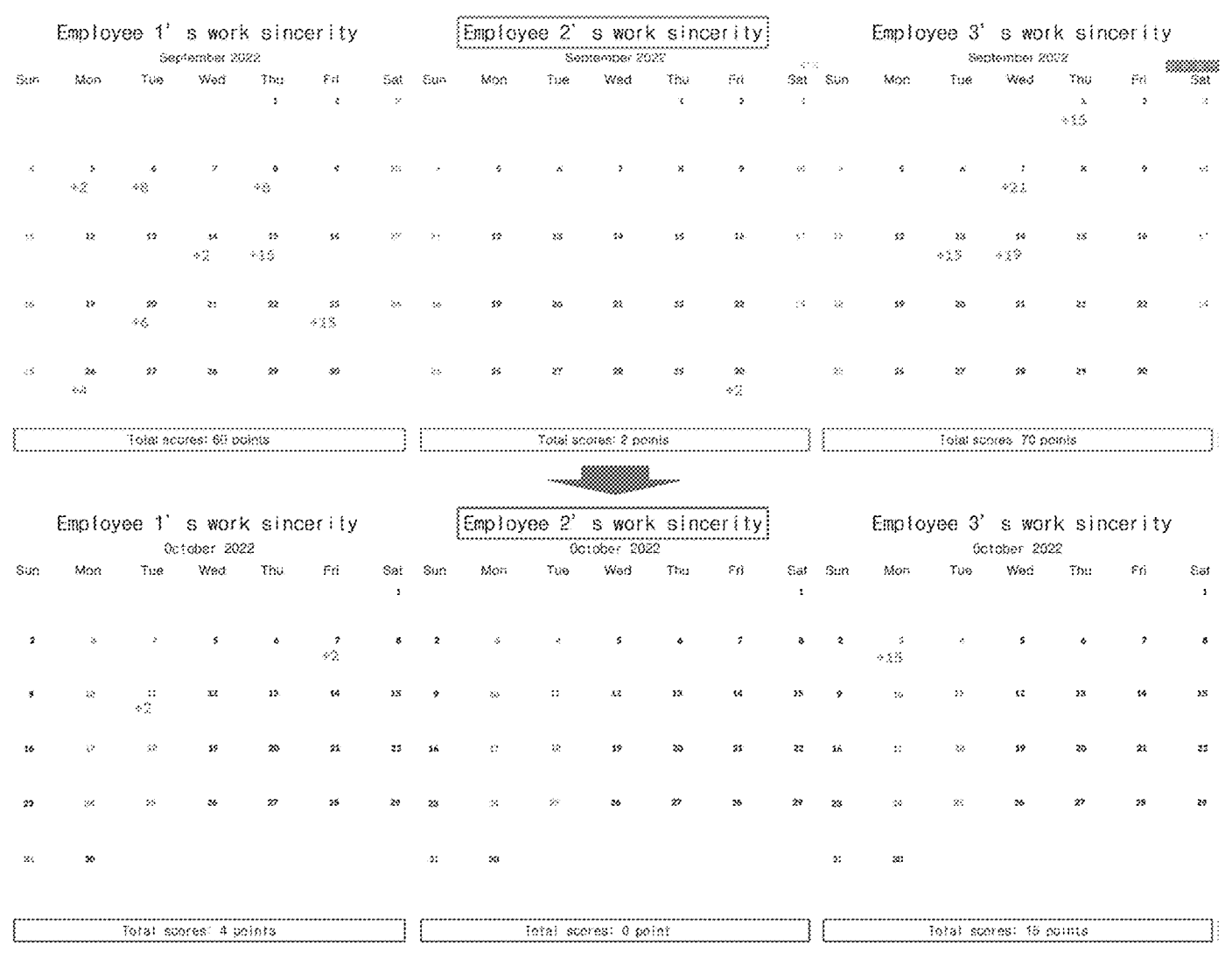

Regarding this, a comparative explanation will be provided based on the two-month work performance scenario of Employees 1 to 3. FIG. 12 is an exemplary diagram showing work sincerity data for September and October of Employee 1 to Employee 3.

FIG. 12 shows a case where Employees 1 to 3 have work sincerity data for September and October. To aid understanding, it is assumed that work sincerity data is improved in October compared to September. It can be seen that the work sincerity data for Employees 1 to 3 are improved significantly.

As shown in FIG. 13, preprocessing is performed on the TNM values calculated using Equation 1. FIG. 13 is an exemplary diagram showing the preprocessed TNM values of FIG. 12.

Next, a normalization process is performed on the preprocessed TNM values as shown in FIG. 14. FIG. 14 is an exemplary diagram showing a process of normalizing the preprocessed TNM values of FIG. 13.

Figure 15:
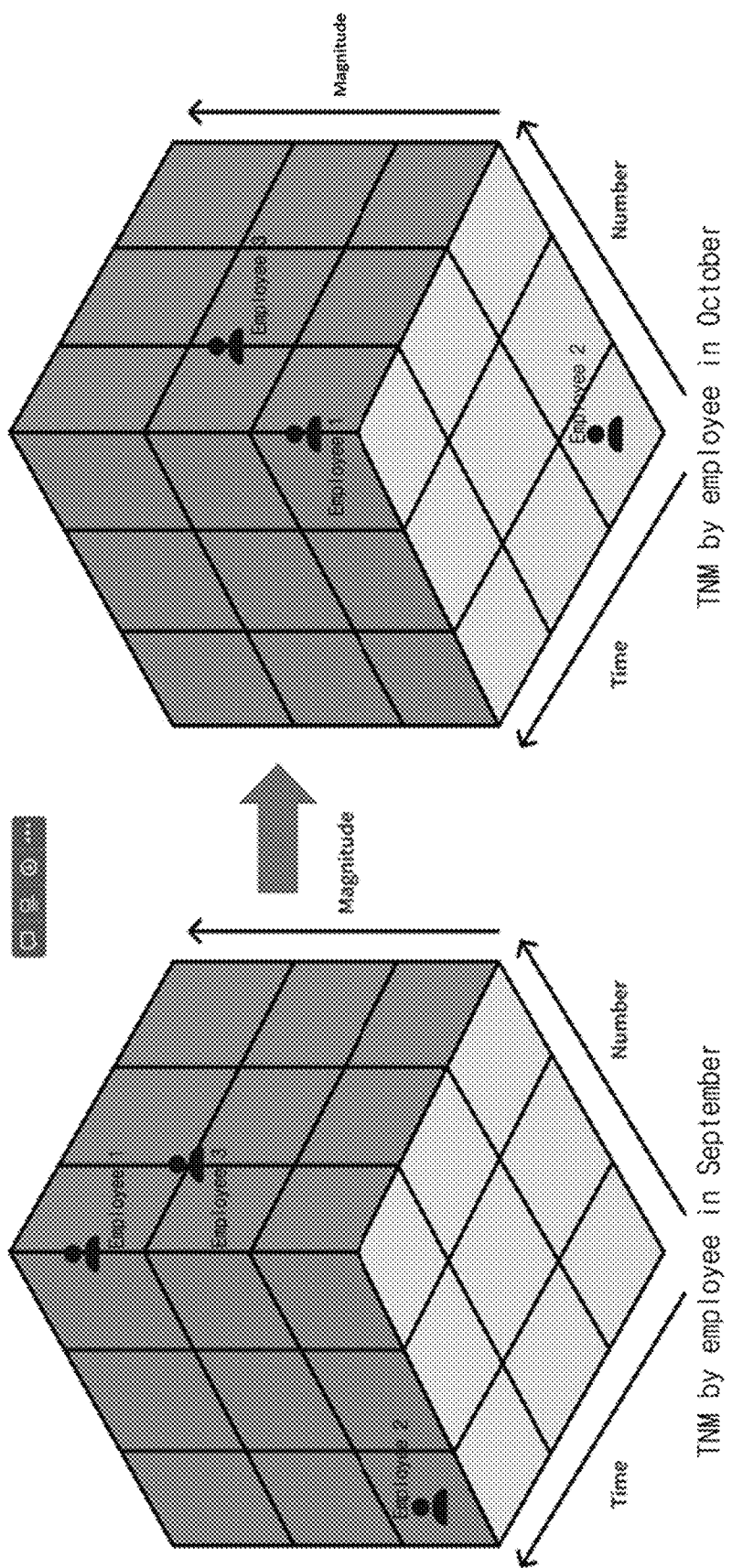
FIG. 15 is an exemplary diagram showing results of displaying the normalized TNM values of FIG. 14 on a three-axis graph.

The normalized TNM values are visualized in a three-axis graph as shown in FIG. 15. FIG. 15 is an exemplary diagram showing results of displaying the normalized TNM values of FIG. 14 on a three-axis graph.

Referring to FIG. 15, from the coordinates of Employees 1 to 3 displayed on the 3-axis graph in September and October, it can be intuitively seen that the TNM values are getting closer to the excellent talent (ideal talent) at coordinates (0, 0, 0) in October compared to September.

Improvements

FIG. 15 shows an example of individually performing work evaluations for September and October based on work sincerity data for September and October, respectively, but this is not construed as a limitation. In another example, work sincerity data for September and October may be grouped to perform a September-October work evaluation.

The above-described analysis of TNM values is a case where normalization is individually performed based on each of the maximum/minimum values of September and the maximum/minimum values of October. However, in order to examine improvements over the two months of September and October, the maximum/minimum values must be obtained from the September to October period and applied to the normalization process to obtain more precise results. In the September-October period, the criteria for applying normalization according to the maximum/minimum value of each evaluation influence factor is changed as shown in FIG. 16. FIG. 16 is an exemplary diagram showing normalization-applying criteria for two-month work sincerity data of Employee 1 to Employee 3.

For the TNM values calculated using Equation 1, a normalization process is performed after preprocessing, as shown in FIG. 17. FIG. 17 is an exemplary diagram showing normalized TNM values calculated by applying the normalization-applying criteria of FIG. 16.

Referring to FIG. 17, preprocessing and normalization of TNM values in the September to October period are also performed in the same manner as preprocessing and normalization of TNM values in September or October.

When analyzing the normalized TNM values in the September-October period, it can be seen that the work evaluation results for Employee 1 to Employee 3 are all significantly improved based on TNM in October compared to September.

Figure 18:
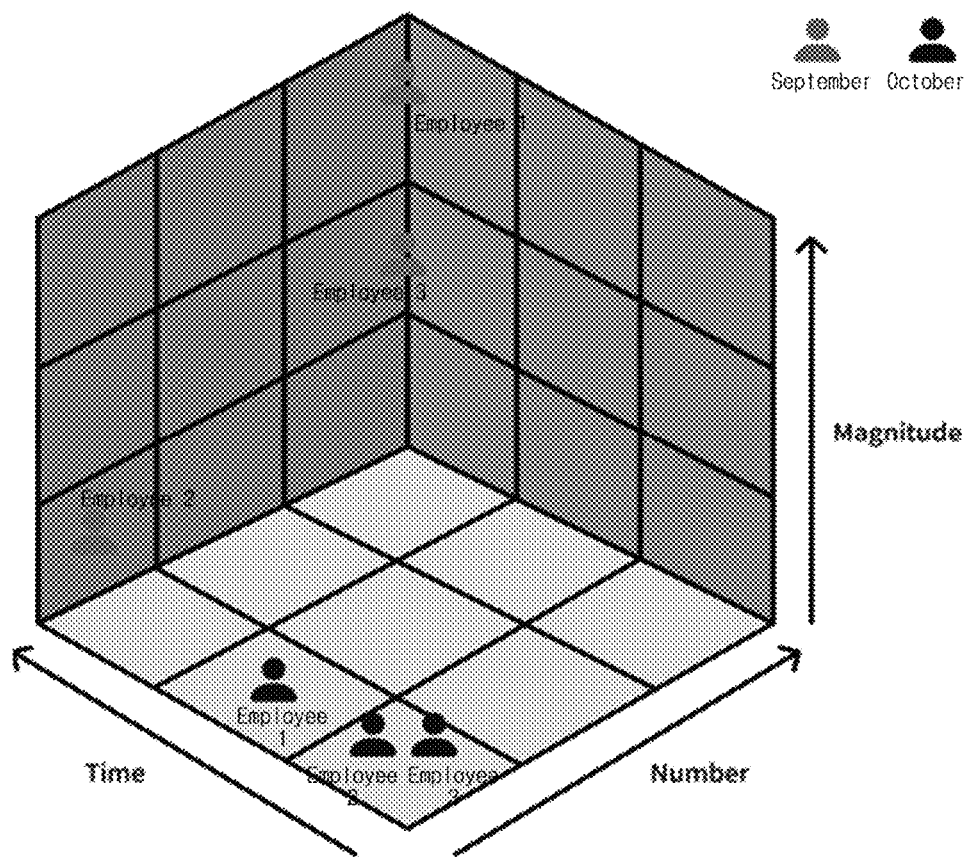
FIG. 18 is an exemplary diagram showing results of displaying the normalized TNM values of FIG. 17 on a three-axis graph.

The normalized TNM values in the September-October period are visualized in a three-axis graph, as shown in FIG. 18. FIG. 18 is an exemplary diagram showing results of displaying the normalized TNM values of FIG. 17 on a three-axis graph.

Referring to FIG. 18, from the coordinates of Employees 1 to 3 displayed on the 3-axis graph, it can be intuitively seen that the TNM values are getting closer to the excellent talent (ideal talent) at coordinates (0, 0, 0) in October compared to September.

Moreover, rather than separately performing work evaluations in September and October as shown in FIG. 15, integrally performing work evaluations in the September to October period as shown in FIG. 18 makes it easier to recognize the improvements made by Employees 1 to 3. In other words, rather than applying normalization with the maximum/minimum values in each of September and October, applying normalization based on the same maximum/minimum values for the September to October period makes it possible to know the improvements more intuitively. It can be seen that all Employees 1 to 3 in October are closer to excellent talents (ideal talent).

Improvement Yardstick; Improvement Rate

To identify the yardstick of improvements, the improvement score (IS) is calculated as shown in Equation 2. Considering that TNM visualization is based on a 3D graph, the improvement score (IS) is defined as a distance (d) between the employee's coordinate location (t1, n1, m1) in the previous month (e.g., September) and the coordinate location (t2, n2, m2) in this month (e.g. October), and it is used as the improvement yardstick.

Of course, there may be cases where it gets worse, but since such cases can be sufficiently discerned in the visualization process, they are not dealt with in the embodiment, and the case of improvement is explained based on the improvement yardstick.

FIG. 19 is an exemplary diagram showing improvement scores of Employee 1 to Employee 3.

Referring to FIG. 19, the improvement score can be calculated using Equation 2. Comparing the improvement scores of Employee 1 to Employee 3, it can be seen that Employee 1 has the greatest improvement.

In order to perform a customized work evaluation optimized for each company's ideal talent, weights can be applied in the process of deriving the TNM values.

Figure 20:
FIG. 20 is an exemplary diagram showing TNM values before and after applying weights to two-month work sincerity data of Employee 1 to Employee 3.

Although the above is the case where the weight is fixed to 1, the case where a value other than 1 is applied as the weight will be described with reference to FIG. 20. FIG. 20 is an exemplary diagram showing TNM values before and after applying weights to two-month work sincerity data of Employee 1 to Employee 3.

Referring to FIG. 20, this is a case where a weight of 0.5 is applied to the violation time (T) and a weight of 2 is applied to the violation magnitude (M). The default weight of 1 is applied to the violation number (N).

As such, the company-customized work evaluation can be used by placing greater weight on the evaluation influence factors (T, N, M) that each company considers important. If greater weight is given to the evaluation influence factors considered important by each company and the TNM value is calculated, the increase becomes wider, making it easier to track employees who fit the company's ideal of talent.

In the example of calculating the unweighted TNM value, Employee 1 receives a worse evaluation than Employee 3 (94>88). However, in the example of calculating the TNM value by applying weights to the company's important evaluation influence factors, it can be seen that Employee 3's evaluation is worse than Employee 1 (151>141).

Although an example of applying weights to each evaluation influence factor has been described, weights can be applied to each evaluation item included in each evaluation influence factor as can be seen in Equation 1.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A computer-implemented data processing apparatus, the apparatus comprising:
 a communication interface configured to communicate with a manager terminal and a plurality of employee terminals; and
 a controller in data communication with the communication interface and configured to:
  receive an input of setting values for work sincerity and work concentration each including a plurality of evaluation items, setting values for weights for the respective evaluation items, and setting values for satisfaction/violation conditions from the manager terminal through the communication interface, to receive data on work sincerity and work concentration obtained by collecting and counting event information on satisfaction/violation for each evaluation item according to an employee's work from the employee terminals, to perform work evaluation on a plurality of employees via a work evaluation algorithm that uses the work sincerity and work concentration data and the weights as input values, and to perform an integrated work evaluation by applying an integrated weight to the work evaluation based on the work sincerity and the work concentration,
 the work evaluation algorithm configured to:
  perform the work evaluation on the plurality of employees, based on a TNM value (TNM_WES) calculated by applying a plurality of evaluation influence factors including a violation time (T), a violation number (N), and a violation magnitude (M) for each evaluation item, and weights assigned to the plurality of evaluation influence factors,
  wherein the violation time (T) is an evaluation influence factor for when an employee most recently committed a violation, the violation number (N) is an evaluation influence factor for how often an employee commits a violation, and the violation magnitude (M) is an evaluation influence factor for the degree (magnitude) of the employee's violation,
 the controller further configured to:
  calculate the TNM value for each particular period,
  in order to unify a value of the violation time (T) with other values, preprocess a most recent violation date, used as the violation time (T), based on a last day of the particular period to count days by using a start date of the particular period as 1st, normalize preprocessed TNM values for each evaluation influence factor to calculate normalized TNM values, define a plurality of levels for each evaluation influence factor, set normal values differentially for the plurality of levels, identify minimum and maximum values for the values calculated for each evaluation influence factor, divide a difference value between the identified minimum and maximum values into a plurality of values corresponding to the plurality of levels, normalize the preprocessed TNM values to the normal value of the plurality of corresponding levels to calculate the normalized TNM values, convert the normalized TNM value into a coordinate position of (T, N, M), visualize the normalized TNM values as a three-dimensional graph using the violation time (T), the violation number (N), and the violation magnitude (M) as axes in which coordinates of (0, 0, 0) in the three-dimensional graph represent an excellent talent pursued by a company, such that an employee or a manager intuitively recognizes the work evaluation results by comparing his/her or other employee's coordinates with the coordinates of excellent talent on the three-dimensional graph, divide a particular period into a plurality of unit periods, calculate normalized TNM values for each unit period, and provide information about a degree of improvement in work evaluation through changes in the normalized TNM values for each unit period, in providing the information about the degree of the improvement, the controller further configured to:

calculate an improvement score (IS) for each of a first employee and a second employee in a first unit period and a second unit period later in time than the first unit period by converting the normalized TNM values into a first coordinate position of the first unit period (t1, n1, m1) and a second coordinate position of the second unit period (t2, n2, m2) and calculating a distance between the two coordinate positions as the improvement score (IS) using Equation 2 below, $$IS(\text{ImprovementScore}) = \sqrt{(t2-t1)^2 + (n2-n1)^2 + (m2-m1)^2}; \quad \text{EQUATION 2}$$

compare the improvement score of the first employee and the improvement score of the second employee;

determine a greater performing employee of the first employee or the second employee based on compared improvement scores;

translate the improvement scores and the first and second coordinate positions of the first and second employees into data to be displayed in the three-dimensional graph; and display, in the three-dimensional graph, the improvement score of the first employee as a first distance and the improvement score of the second employee as a second distance in the first and second unit periods, wherein the first distance and the second distance are different from each other.

2. The apparatus of claim 1, wherein the evaluation items included in the work sincerity includes compliance with commuting time, a number of times of tardiness, a number of times of early leaving, a number of times of absenteeism without notice, a number of times schedules (deadlines) are not met, and a number of complaints triggered, and wherein the evaluation items included in the work concentration includes number and time of use of work-unrelated apps, number and time of use of work-related apps, and number of negative evaluations and reports by managers/colleagues.

3. The apparatus of claim 2, wherein among the evaluation items included in the work sincerity, for the compliance with commuting time, the number of times of tardiness, the number of times of early leaving, the number of times of absenteeism without notice, and the number of times schedules (deadlines) are not met, event information is collected and counted based on first/last use time of the employee terminal, first/last use time of the work management program, a network access time within the company, and vehicle departure recognition information, and wherein among the evaluation items included in the work concentration, for the number and time of use of work-unrelated apps, the number and time of use of work-related apps, and the number of negative evaluations and reports by managers/colleagues, event information is collected and counted based on first/last use time of the employee terminal, first/last use time of the work management program, first/last use time of a work-unrelated program, a network access time within the company, and a receipt of negative evaluations/reports.

4. The apparatus of claim 2, wherein the number of complaints triggered, and the number of negative evaluations and reports by managers/colleagues are collected from the manager terminal or a complaint reception device.

5. The apparatus of claim 2, wherein the controller is configured to calculate the TNM value using Equation below:

$$TNM\_WES \text{ (Work Evaluation Score)} = (w1*(w11*aT + w12*bT + \ldots w15eT)) + (w2*(w21*aN + w22*bN + \ldots w25eN)) + (w3*(w31*aM + w33*bM + \ldots w35eM)) \quad \text{[Equation]}$$

T: Time of violation
N: Number of violations
M: Magnitude of violation
aT: Violation time of commute
aN: Violation number of commute
aM: Violation magnitude of commute
bT: Violation time of early leaving
bN: Violation number of early leaving
bM: Violation magnitude of early leaving
cT: Violation time of absenteeism
cN: Violation number of absenteeism
cM: Violation magnitude of absenteeism
dT: Violation time of schedule or deadline
dN: Violation number of schedule or deadline
dM: Violation magnitude of schedule or deadline
eT: Violation time of complaint (occurrence)
eN: Violation number of complaint (occurrence)
eM: Violation magnitude of complaint (occurrence)
w1~w3: Weights for evaluation influence factors (violation time, violation number, and violation magnitude)
w11~w35: Weights for evaluation items.

6. A computer-implemented data processing system, the system comprising:

a manager terminal configured to deliver an input of setting values for work sincerity and work concentration each including a plurality of evaluation items, setting values for weights for the respective evaluation items, and setting values for satisfaction/violation conditions to a data processing apparatus;

a plurality of employee terminals each configured to deliver data on work sincerity and work concentration obtained by collecting and counting event information on satisfaction/violation for each evaluation item according to an employee's work to the data processing apparatus; and the data processing apparatus configured to perform work evaluation on a plurality of employees via a work evaluation algorithm that uses the work sincerity and work concentration data and the weights as input values, and to perform an integrated work evaluation by applying an integrated weight to the work evaluation based on the work sincerity and the work concentration, the work evaluation algorithm configured to perform the work evaluation on the plurality of employees, based on a TNM value (TNM_WES) calculated by applying a plurality of evaluation influence factors including a violation time (T), a violation number (N), and a violation magnitude (M) for each evaluation item, and weights assigned to the plurality of evaluation influence factors, wherein the violation time (T) is an evaluation influence factor for when an employee most recently committed a violation, the violation number (N) is an evaluation influence factor for how often an employee commits a violation, and the violation magnitude (M) is an evaluation influence factor for the degree (magnitude) of the employee's violation, the data processing apparatus further configured to:

calculate the TNM value for each particular period, in order to unify a value of the violation time (T) with other values, preprocess a most recent violation date, used as the violation time (T), based on a last day of the particular period to count days by using a start date of the particular period as 1st, normalizes preprocessed TNM values for each evaluation influence factor to calculate normalized TNM values, defines a plurality of levels for each evaluation influence factor, sets normal values differentially for the plurality of levels, identifies minimum and maximum values for the values calculated for each evaluation influence factor, divides a difference value between the identified minimum and maximum values into a plurality of values corresponding to the plurality of levels, and normalizes the preprocessed TNM values to the normal value of the plurality of corresponding levels to calculate the normalized TNM values, convert the normalized TNM value into a coordinate position of (T, N, M), visualize the normalized TNM values as a three-dimensional graph using the violation time (T), the violation number (N), and the violation magnitude (M) as axes in which coordinates of (0, 0, 0) in the three-dimensional graph represent an excellent talent pursued by a company, such that an employee or a manager intuitively recognizes the work evaluation results by comparing his/her or other employee's coordinates with the coordinates of excellent talent on the three-dimensional graph, and divide a particular period into a plurality of unit periods, calculate normalized TNM values for each unit period, and provide information about a degree of improvement in work evaluation through changes in the normalized TNM values for each unit period, in providing the information about the degree of the improvement, the data processing apparatus further configured to:

calculate an improvement score (IS) for each of a first employee and a second employee in a first unit period and a second unit period later in time than the first unit period by converting the normalized TNM values into a first coordinate position of the first unit period (t1, n1, m1) and a second coordinate position of the second unit period (t2, n2, m2) and calculating a distance between the two coordinate positions as the improvement score (IS) using Equation 2 below, $$\text{IS(ImprovementScore)} = \sqrt{(t2-t1)^2 + (n2-n1)^2 + (m2-m1)^2}; \quad \text{EQUATION 2}$$

compare the improvement score of the first employee and the improvement score of the second employee;

determine a greater performing employee of the first employee or the second employee based on compared improvement scores;

translate the improvement scores and the first and second coordinate positions of the first and second employees into data to be displayed in the three-dimensional graph; and display, in the three-dimensional graph, the improvement score of the first employee as a first distance and the improvement score of the second employee as a second distance in the first and second unit periods, wherein the first distance and the second distance are different from each other.

7. A computer-implemented data processing method, the method comprising:

by a data processing apparatus, receiving an input of setting values for work sincerity and work concentration each including a plurality of evaluation items, setting values for weights for the respective evaluation items, and setting values for satisfaction/violation conditions from a manager terminal;

by the data processing apparatus, receiving data on work sincerity and work concentration obtained by collecting and counting event information on satisfaction/violation for each evaluation item according to an employee's work from a plurality of employee terminals;

by the data processing apparatus, performing work evaluation on a plurality of employees via a work evaluation algorithm that uses the work sincerity and work concentration data and the weights as input values; and by the data processing apparatus, performing an integrated work evaluation by applying an integrated weight to the work evaluation based on the work sincerity and the work concentration, wherein the work evaluation algorithm performs the work evaluation on the plurality of employees, based on a TNM value (TNM_WES) calculated by applying a plurality of evaluation influence factors including a violation time (T), a violation number (N), and a violation magnitude (M) for each evaluation item, and weights assigned to the plurality of evaluation influence factors, wherein the violation time (T) is an evaluation influence factor for when an employee most recently committed a violation, the violation number (N) is an evaluation influence factor for how often an employee commits a violation, and the violation magnitude (M) is an evaluation influence factor for the degree (magnitude) of the employee's violation, wherein performing the work evaluation on the plurality of employees by the data processing system includes:

calculating the TNM value for each particular period, and in order to unify a value of the violation time (T) with other values, preprocessing a most recent violation date, used as the violation time (T), based on a last day of the particular period to count days by using a start date of the particular period as 1st, normalizing preprocessed TNM values for each evaluation influence factor to calculate normalized TNM values, defining a plurality of levels for each evaluation influence factor, setting normal values differentially for the plurality of levels, identifying minimum and maximum values for the values calculated for each evaluation influence factor, dividing a difference value between the identified minimum and maximum values into a plurality of values corresponding to the plurality of levels, and normalizing the preprocessed TNM values to the normal value of the plurality of corresponding levels to calculate the normalized TNM values, converting the normalized TNM value into a coordinate position of (T, N, M), and visualizing the normalized TNM values as a three-dimensional graph using the violation time (T), the violation number (N), and the violation magnitude (M) as axes in which coordinates of (0, 0, 0) in the three-dimensional graph represent an excellent talent pursued by a company, such that an employee or a manager intuitively recognizes the work evaluation results by comparing his/her or other employee's coordinates with the coordinates of excellent talent on the three-dimensional graph, and dividing a particular period into a plurality of unit periods, calculating normalized TNM values for each unit period, and providing information about a degree of improvement in work evaluation through changes in the normalized TNM values for each unit period, wherein providing the information about the degree of the improvement comprises:

calculating an improvement score (IS) for each of a first employee and a second employee in a first unit period and a second unit period later in time than the first unit period by converting the normalized TNM values into a first coordinate position of the first unit period (t1, n1, m1) and a second coordinate position of the second unit period (t2, n2, m2) and calculating a distance between the two coordinate positions as the improvement score (IS) using Equation 2 below, $$\text{IS(ImprovementScore)} = \sqrt{(t2-t1)^2 + (n2-n1)^2 + (m2-m1)^2}; \qquad \text{EQUATION 2}$$

comparing the improvement score of the first employee and the improvement score of the second employee;

determining a greater performing employee of the first employee or the second employee based on compared improvement scores; and translating the improvement scores and the first and second coordinate positions of the first and second employees into data to be displayed in the three-dimensional graph; and displaying, in the three-dimensional graph, the improvement score of the first employee as a first distance and the improvement score of the second employee as a second distance in the first and second unit periods, wherein the first distance and the second distance are different from each other.

8. The apparatus of claim 1, wherein the controller is further configured to display, in the three-dimensional graph, a relative location of the first employee and a relative location of the second employee with respect to the coordinates (0, 0, 0), where the excellent talent is located, to three dimensionally show how much the first employee and the second employee deviate from the coordinates (0, 0, 0).

* * * * *